US009053338B2

(12) United States Patent
Baker

(10) Patent No.: US 9,053,338 B2
(45) Date of Patent: Jun. 9, 2015

(54) METHODS, APPARATUSES, AND COMPUTER PROGRAM PRODUCTS FOR EXCEPTION HANDLING

(75) Inventor: Eugene Baker, Roswell, GA (US)

(73) Assignee: McKesson Financial Holdings, Hamilton (BM)

(*) Notice: Subject to any disclaimer, the term of this patent is extended or adjusted under 35 U.S.C. 154(b) by 5 days.

(21) Appl. No.: 13/236,715

(22) Filed: Sep. 20, 2011

(65) Prior Publication Data
US 2013/0074193 A1 Mar. 21, 2013

(51) Int. Cl.
G06F 7/04 (2006.01)
G06F 21/62 (2013.01)

(52) U.S. Cl.
CPC .................. G06F 21/6218 (2013.01)

(58) Field of Classification Search
USPC ....................... 726/27, 28; 713/182
See application file for complete search history.

(56) References Cited

U.S. PATENT DOCUMENTS

| 2003/0007664 | A1* | 1/2003 | Davis et al. .................. 382/100 |
| 2007/0240203 | A1* | 10/2007 | Beck .............................. 726/4 |
| 2009/0019516 | A1* | 1/2009 | Hammoutene et al. ........... 726/1 |
| 2012/0054489 | A1* | 3/2012 | Ranzini ......................... 713/165 |
| 2012/0159185 | A1* | 6/2012 | Day et al. ...................... 713/189 |
| 2012/0159565 | A1* | 6/2012 | Bray et al. ........................ 726/1 |
| 2012/0240224 | A1* | 9/2012 | Payne et al. ..................... 726/21 |

OTHER PUBLICATIONS

NextLabs; HIPPA Overview; [Online]; [Retrieved on Jul. 25, 2011]; Retrieved from the Internet <URL:http://www.nextlabos.com.html/?q=hippa>; 2 pages.

* cited by examiner

Primary Examiner — Christopher Brown
(74) Attorney, Agent, or Firm — Alston & Bird LLP

(57) ABSTRACT

Methods, apparatuses, and computer program products are provided for exception handling. A method may include detecting attempted performance of a prohibited action involving protected data. The method may further include determining based at least in part on a role associated with a user associated with the prohibited action whether the user has elevated rights permitting performance of the prohibited action. The method may additionally include permitting an exception allowing performance of the prohibited action only in an instance in which it is determined that the user does have elevated rights permitting performance of the prohibited action. The method may also include prohibiting performance of the prohibited action in an instance in which it is determined that the user does not have elevated rights permitting performance of the prohibited action. Corresponding apparatuses and computer program products are also provided.

18 Claims, 7 Drawing Sheets

METHODS, APPARATUSES, AND COMPUTER PROGRAM PRODUCTS FOR EXCEPTION HANDLING

TECHNOLOGICAL FIELD

Embodiments of the present invention relate generally to computing technology and, more particularly, to methods, apparatuses, and computer program products for exception handling.

BACKGROUND

The health care industry is currently experiencing a technology-driven revolution in the practice of medicine. In this regard, the evolution of modern computing and networking technology has led to a widespread adoption and increasing reliance on computers and associated software for facilitating patient treatment, maintaining patient treatment records, and for facilitating payment of charges attendant to patient treatment. For example, use of computing technology by health service providers has allowed for the creation and maintenance of electronic health records for patients, including medical treatment and diagnosis records, billing records, insurer explanation of benefits records, and payment records. Electronic maintenance of such records has offered several advantages to health service providers, including more ready access to patient health information and a reduction in reliance on cumbersome paper files, which may be burdensome to maintain and may be more susceptible to data loss than electronic systems.

While the use of computing technology and electronic records has brought many benefits, the portability of electronic records does pose concerns over the potential for the breach of the confidentiality of electronic health records and other confidential electronic data. In this regard, electronic records may be transmitted via email, posted on a social media site, saved to a removable memory, and/or the like. Accordingly, many systems implement data loss prevention measures that prohibit the performance of such actions that may risk the confidentiality of protected data. However, data loss prevention systems that lock down performance of actions that may result in breach of data security may prohibit performance of such actions even in instances in which such actions should be permitted. In this regard, there are instances wherein it is desirable to make an exception to allow performance of an action prohibited as a data loss prevention measure.

BRIEF SUMMARY OF SOME EXAMPLES OF THE INVENTION

Methods, apparatuses, and computer program products are herein provided for exception handling. These methods, apparatuses, and computer program products may provide several advantages to computing devices, system administrators, and users of computing devices. More particularly, some example embodiments provide for automated exception handling. In this regard, some such example embodiments automatically determine whether an exception allowing performance of a prohibited action should be permitted. Accordingly, an administrative burden may be reduced compared to data loss prevention systems wherein a user must submit a ticket for manual review by a system administrator requesting that an exception be made.

In a first example embodiment, a method for exception handling is provided. The method of this example embodiment may comprise detecting attempted performance of a prohibited action involving protected data. The method of this example embodiment may further comprise determining based at least in part on a role associated with a user associated with the prohibited action whether the user has elevated rights permitting performance of the prohibited action. The method of this example embodiment may additionally comprise permitting an exception allowing performance of the prohibited action only in an instance in which it is determined that the user does have elevated rights permitting performance of the prohibited action. The method of this example embodiment may also comprise prohibiting performance of the prohibited action in an instance in which it is determined that the user does not have elevated rights permitting performance of the prohibited action.

In another example embodiment, an apparatus for exception handling is provided. The apparatus of this example embodiment comprises at least one processor. The at least one processor may be configured to cause the apparatus of this example embodiment to at least detect attempted performance of a prohibited action involving protected data. The at least one processor may be further configured to cause the apparatus of this example embodiment to determine based at least in part on a role associated with a user associated with the prohibited action whether the user has elevated rights permitting performance of the prohibited action. The at least one processor may be additionally configured to cause the apparatus of this example embodiment to permit an exception allowing performance of the prohibited action only in an instance in which it is determined that the user does have elevated rights permitting performance of the prohibited action. The at least one processor may also be configured to cause the apparatus of this example embodiment to prohibit performance of the prohibited action in an instance in which it is determined that the user does not have elevated rights permitting performance of the prohibited action.

In a further example embodiment, a computer program product for exception handling is provided. The computer program product of this embodiment includes at least one non-transitory computer-readable storage medium having computer-readable program instructions stored therein. The program instructions of this example embodiment may comprise program instructions configured to detect attempted performance of a prohibited action involving protected data. The program instructions of this example embodiment may further comprise program instructions configured to determine based at least in part on a role associated with a user associated with the prohibited action whether the user has elevated rights permitting performance of the prohibited action. The program instructions of this example embodiment may additionally comprise program instructions configured to permit an exception allowing performance of the prohibited action only in an instance in which it is determined that the user does have elevated rights permitting performance of the prohibited action. The program instructions of this example embodiment may also comprise program instructions configured to prohibit performance of the prohibited action in an instance in which it is determined that the user does not have elevated rights permitting performance of the prohibited action.

In yet another example embodiment, an apparatus for exception handling is provided. The apparatus of this example embodiment may comprise means for detecting attempted performance of a prohibited action involving protected data. The apparatus of this example embodiment may further comprise means for determining based at least in part on a role associated with a user associated with the prohibited action whether the user has elevated rights permitting performance of the prohibited action. The apparatus of this example embodiment may additionally comprise means for permitting an exception allowing performance of the prohibited action only in an instance in which it is determined that the user does have elevated rights permitting performance of the prohibited action. The apparatus of this example embodiment may also comprise means for prohibiting performance of the prohibited action in an instance in which it is determined that the user does not have elevated rights permitting performance of the prohibited action.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
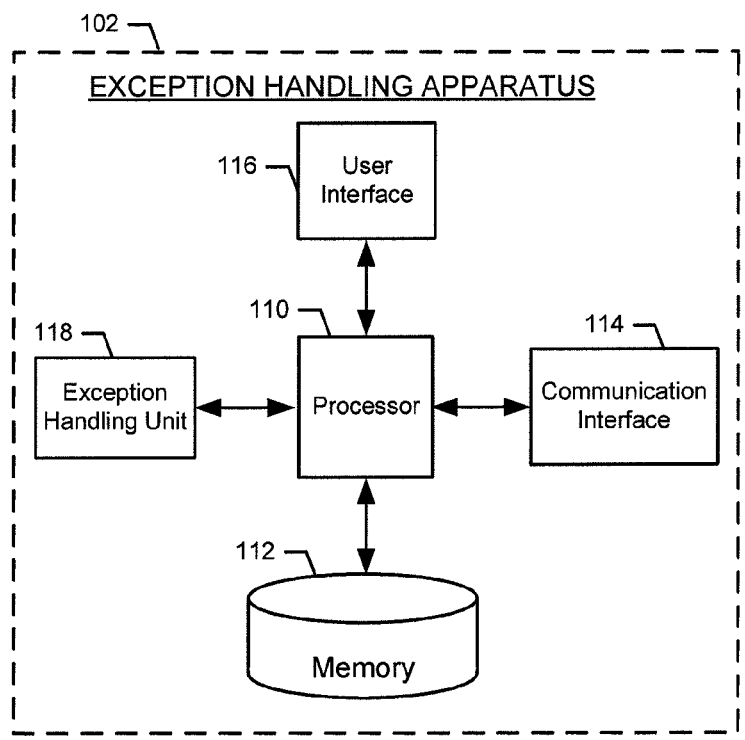
Figure 2:
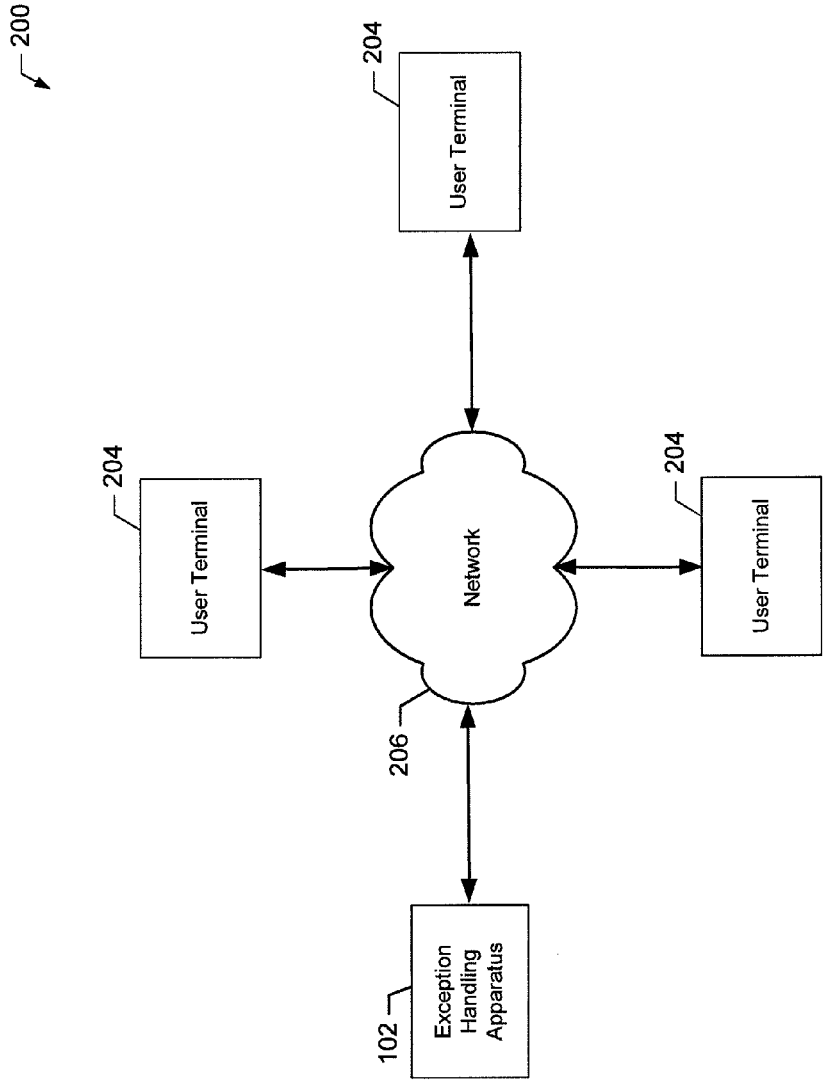
Figure 3:
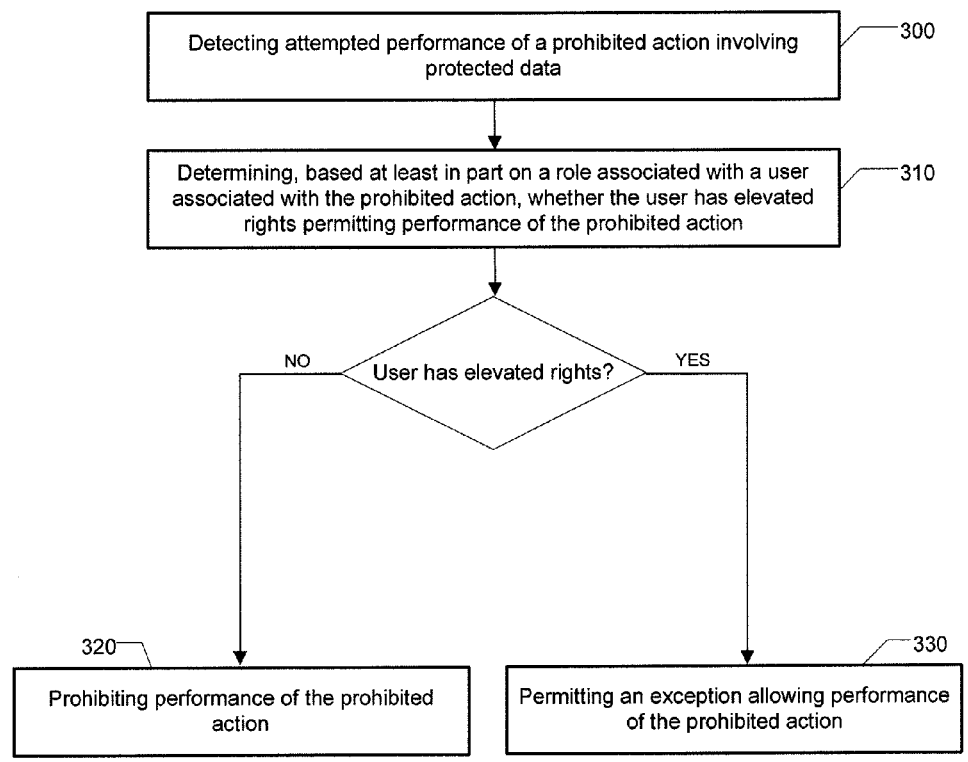
Figure 4:
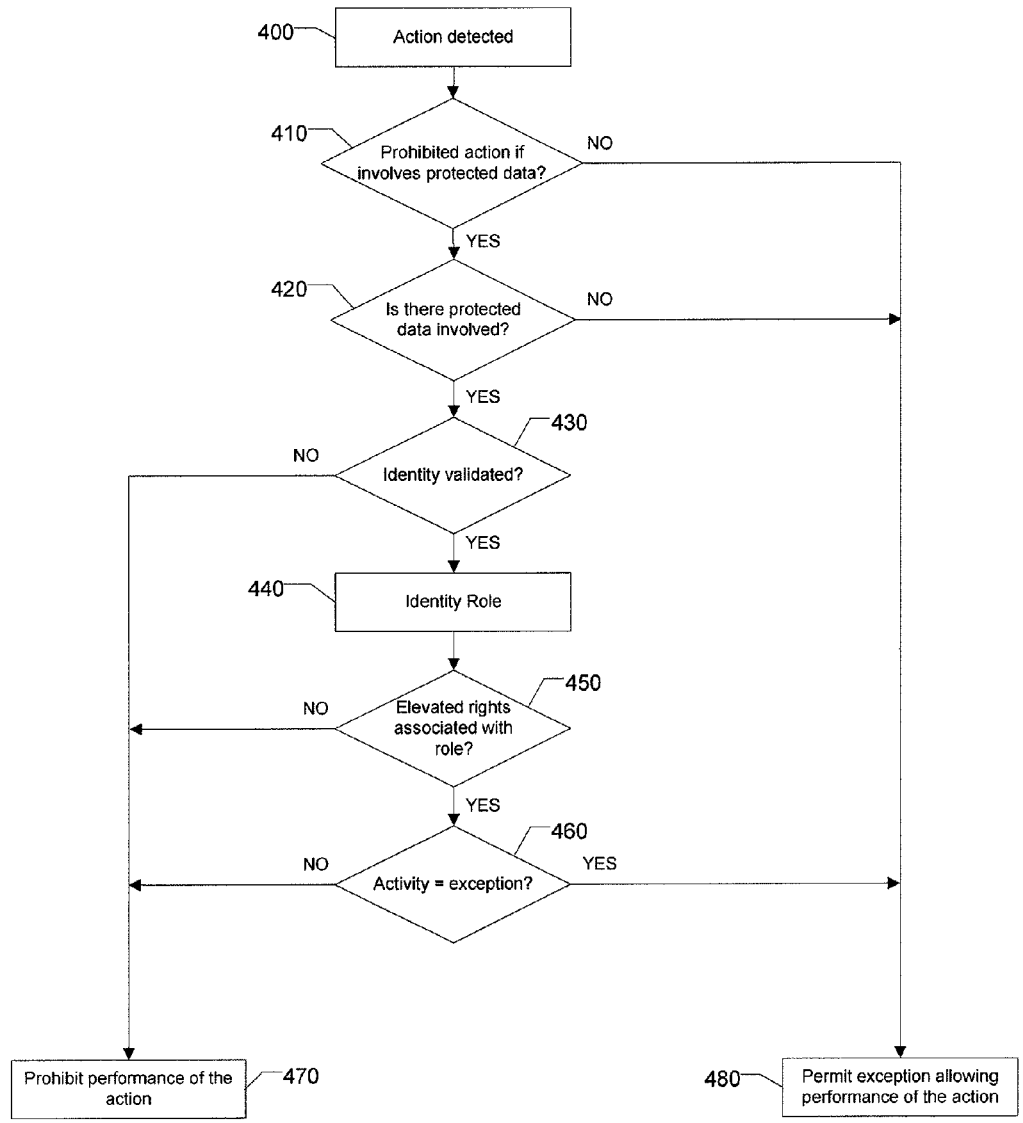
Figure 5:
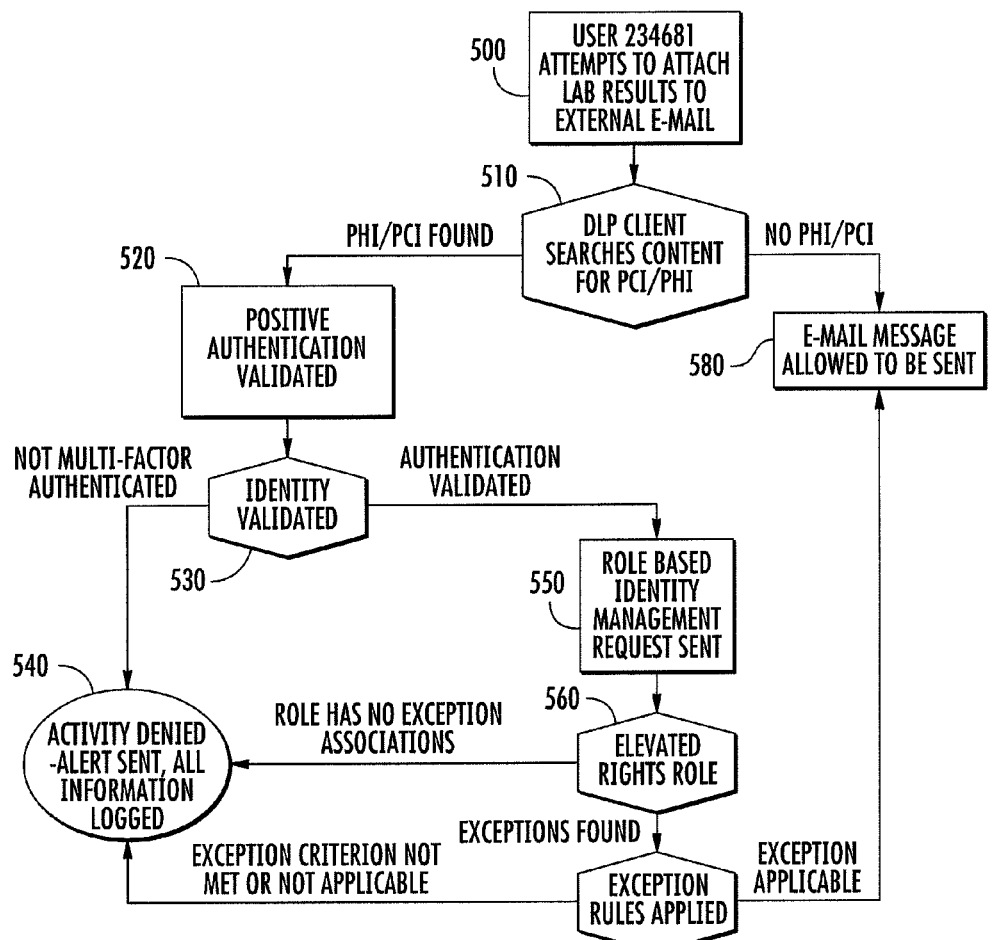
Figure 6:
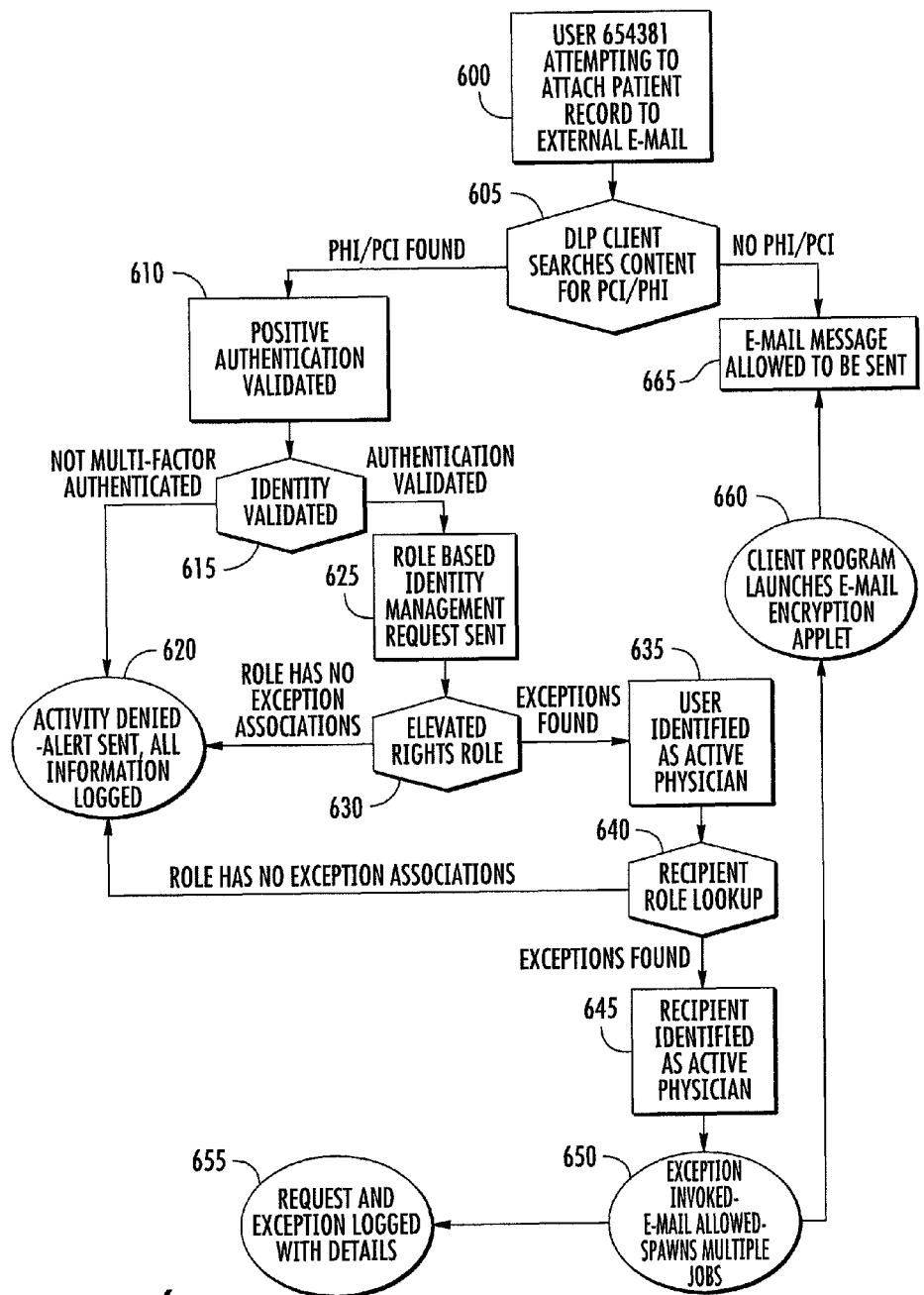
Figure 7:
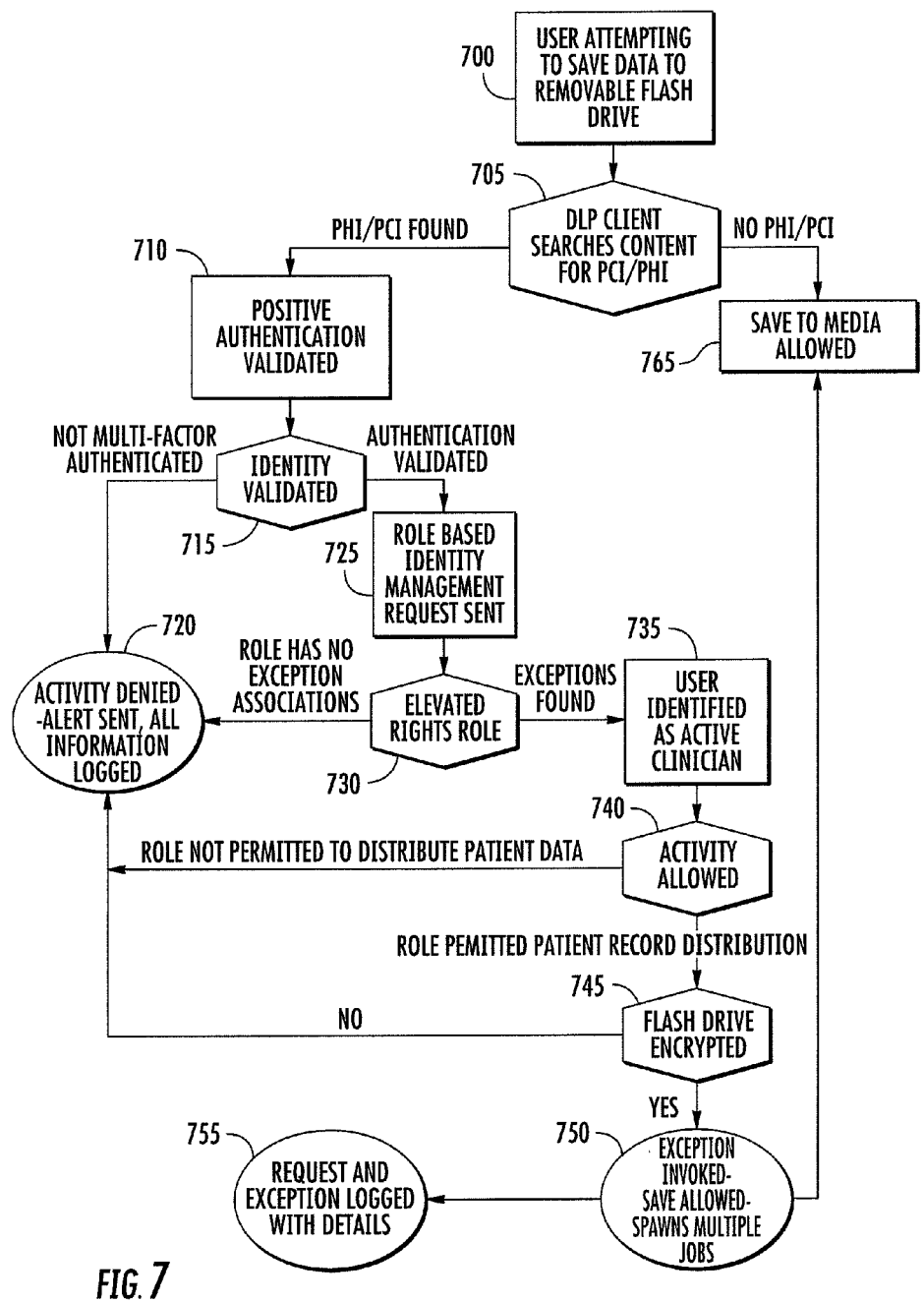

Having thus described embodiments of the invention in general terms, reference will now be made to the accompanying drawings, which are not necessarily drawn to scale, and wherein:

FIG. 1 illustrates a block diagram of an exception handling apparatus for exception handling according to some example embodiments;

FIG. 2 illustrates a system for exception handling according to some example embodiments;

FIG. 3 illustrates a flowchart according to an example method for exception handling according to some example embodiments;

FIG. 4 illustrates a flowchart according to another example method for exception handling according to some example embodiments;

FIG. 5 illustrates a flowchart according to a further example method for exception handling according to some example embodiments;

FIG. 6 illustrates a flowchart according to yet another example method for exception handling according to some example embodiments; and FIG. 7 illustrates a flowchart according to still a further example method for exception handling according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, and/or the like.

Data loss prevention systems are generally configured to prevent saving protected data to portable media, such as flash drives, CD (Compact Disc)/DVD (Digital Versatile Disc) writers, external drives or tapes, and the like. However, there may be selective cases where exceptions need to be made. For example, in health care, a discharge nurse may be required to send a patient home with a physical copy of his or her medical record. In this situation it may be desirable to make an exception to the rules, to allow for the discharge nurse to save the patient's Protected Health Information (PHI) to encrypted portable media. In a second example health care scenario, a physician may need to e-mail a patient record to another physician for a consult. However, data loss prevention systems may deny this action for non-acceptable transport of PHI.

In the past, users have been forced to submit a ticket to a system adminsitrator to request an exception to a data loss prevention lockdown. The system administrator would then have to review the ticket and decide whether to grant or deny the exception. The delay time required for the system administrator to review the ticket may result in an undue delay to users in contexts where time may be of the essence, such as in the example health care scenarios described above. Further, the use of tickets poses problems of scalability, as a system administrator may be overwhelmed by the number of tickets in systems having a large number of users with legitimate exception requirements.

Some example embodiments disclosed herein may provide improved exception handling that may be applied to data loss prevention systems. In this regard, some example embodiments provide automated exception handling that may determine whether an exception allowing performance of an otherwise prohibited action should be granted based at least in part on a role associated with a user that is associated with a prohibited action. Thus, for example, a person having the role of a discharge nurse may be granted elevated rights allowing the discharge nurse to save PHI to a verified encrypted flash memory. As another example, if a user having the role of a physician is sending an email to another physician, an exception may be automatically permitted rather than requiring submission of a ticket to an administrator. Accordingly, some example embodiments leverage user identity and associated roles in data loss prevention systems to provide for automated exception handling prior to escalation to a system administrator. These example embodiments may accordingly provide for faster exception handling and may reduce an administrative burden on system administrators.

Referring now to FIG. 1, FIG. 1 illustrates a block diagram of an exception handling apparatus 102 for exception handling according to some example embodiments. It will be appreciated that the exception handling apparatus 102 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an exception handling apparatus, numerous other configurations may also be used to implement embodiments of the present invention.

The exception handling apparatus 102 may be embodied as any computing device or combination of a plurality of computing devices configured to detect attempted performance of a prohibited action involving protected data and determine whether to permit an exception in accordance with one or more example embodiments. In this regard, by way of non-limiting example, the exception handling apparatus 102 may be at least partially embodied as one or more servers, a server cluster, a cloud computing infrastructure, one or more desktop computers, one or more laptop computers, a mobile computing device, a tablet computing device, one or more workstations, one or more network nodes, multiple computing devices in communication with each other, any combination thereof, and/or the like.

In some example embodiments the exception handling apparatus 102 includes various means for performing the various functions described herein. These means may include, for example, one or more of a processor 110, memory 112, communication interface 114, user interface 116, or exception handling unit 118 for performing the various functions herein described. The means of the exception handling apparatus 102 as described herein may be embodied as, for example, circuitry, hardware elements (e.g., a suitably programmed processor, combinational logic circuit, and/or the like), a computer program product comprising a computer-readable medium (e.g. memory 112) storing computer-readable program instructions (e.g., software or firmware) that are executable by a suitably configured processing device (e.g., the processor 110), or some combination thereof.

The processor 110 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 may comprise a plurality of processors. The plurality of processors may be embodied on a single computing device or may be distributed across a plurality of computing devices collectively configured to function as the exception handling apparatus 102. The plurality of processors may be in operative communication with each other and may be collectively configured to perform one or more functionalities of the exception handling apparatus 102 as described herein. In some embodiments, the processor 110 may be configured to execute instructions stored in the memory 112 or otherwise accessible to the processor 110. These instructions, when executed by the processor 110, may cause the exception handling apparatus 102 to perform one or more of the functionalities of the exception handling apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 1 as a single memory, the memory 112 may comprise a plurality of memories. The plurality of memories may be embodied on a single computing device or distributed across a plurality of computing devices. The memory 112 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 112 may comprise any non-transitory computer readable storage medium. The memory 112 may be configured to store information, data, applications, instructions, or the like for enabling the exception handling apparatus 102 to carry out various functions in accordance with example embodiments of the present invention. For example, in some example embodiments, the memory 112 is configured to buffer input data for processing by the processor 110. Additionally or alternatively, in some example embodiments, the memory 112 is configured to store program instructions for execution by the processor 110. The memory 112 may store information in the form of static and/or dynamic information. This stored information may be stored and/or used by the exception handling unit 118 during the course of performing its functionalities.

The communication interface 114 may be embodied as any device or means embodied in circuitry, hardware, a computer program product comprising a computer readable medium (e.g., the memory 112) storing computer readable program instructions executed by a processing device (e.g., the processor 110), or a combination thereof that is configured to receive and/or transmit data from/to another device, such as, for example, a user terminal 204 (shown in FIG. 2). In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver, a network adapter, and/or supporting hardware or software for enabling communications with another computing device. The communication interface 114 may be configured to receive and/or transmit data using any protocol that may be used for communications between computing devices. As an example, the communication interface 114 may be configured to receive and/or transmit data using any protocol and/or communications technology that may be used for communicating over a network, such as the network 206 illustrated in FIG. 2. The communication interface 114 may additionally be in communication with the memory 112, user interface 116, and/or exception handling unit 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some example embodiments wherein the exception handling apparatus 102 is embodied as one or more servers, one or more described aspects of the user interface 116 may be eliminated, or the user interface 116 may be eliminated entirely. In embodiments including a user interface 116, the user interface 116 may be in communication with the memory 112, communication interface 114, and/or exception handling unit 118, such as via a bus.

The exception handling unit 118 may be embodied as various means, such as circuitry, hardware, a computer program product comprising a computer readable medium (e.g., the memory 112) storing computer readable program instructions executed by a processing device (e.g., the processor 110), or some combination thereof and, in some example embodiments, is embodied as or otherwise controlled by the processor 110. In embodiments wherein the exception handling unit 118 is embodied separately from the processor 110, the exception handling unit 118 may be in communication with the processor 110. The exception handling unit 118 may further be in communication with one or more of the memory 112, communication interface 114, or user interface 116, such as via a bus.

Referring now to FIG. 2, FIG. 2 illustrates a block diagram of a system 200 for exception handling according to some example embodiments. In this regard, FIG. 2 illustrates an example of a system in which the exception handling apparatus 102 may be implemented. In some embodiments, the system 200 includes one or more user terminals 204, which may be configured to communicate with the exception handling apparatus 102 over a network 206. The network 206 may comprise one or more wireless networks (e.g., a cellular network, wireless local area network, wireless metropolitan area network, and/or the like), one or more wireline networks (e.g., a wired local area network), or some combination thereof, and in some embodiments comprises at least a portion of the internet.

A user terminal 204 may comprise any computing device which may be used by a user to perform an action that may manipulate data including actions that may facilitate transfer or transport of data, such as, for example, saving data to a memory, emailing data, posting data to a network, and/or the like. By way of example, a user terminal 204 may comprise a desktop computer, a laptop computer, a mobile computing device (e.g., a smart phone), a tablet computing device, a network node, multiple computing devices in communication with each other, any combination thereof, and/or the like. In this regard, in some example embodiments, when a user of a user terminal 204 attempts to perform a prohibited action involving protected data, the exception handling unit 118 associated with the exception handling apparatus 102 may detect the attempted performance of the prohibited action and determine whether to permit an exception allowing performance of the prohibited action in accordance with one or more example embodiments. In this regard, in some example embodiments, the exception handling apparatus 102 may be implemented as a centralized data loss prevention system that may enforce a data loss prevention policy across a network 206 comprising one or more user terminals 204. As such, it will be appreciated that where the exception handling unit 118 is described to detect attempted performance of a prohibited action involving protected data, the detected attempted performance of a prohibited action may occur at a user terminal remote from the exception handling apparatus 102.

Additionally or alternatively, in some example embodiments, the exception handling apparatus 102 may be implemented on a computing device, such as a user terminal 204, which may be used to manipulate data, such as via input to the user interface 116. In this regard, the exception handling apparatus 102 may be implemented on a user terminal so as to enforce a data loss prevention policy on the user terminal. In such example embodiments, the exception handling unit 118 may accordingly be configured to detect an attempted performance of a prohibited action involving protected data occurring locally on the exception handling apparatus 102, such as in response to user input to the user interface 116.

As such, it will be appreciated that where the exception handling unit 118 is described to detect an attempted performance of a prohibited action involving protected data, that attempted performance may have occurred locally at the exception handling apparatus, or may have occurred remotely at a user terminal (e.g., a user terminal 204) that may communicate with the exception handling apparatus 102 via a network (e.g., the network 206).

In detecting attempted performance of a prohibited action involving protected data, the exception handling unit 118 may be configured to directly detect the attempted performance. For example, the exception handling unit 118 may monitor the user interface 116 and detect a user input for performing a prohibited action. As another example, the exception handling unit 118 may detect remote performance (e.g., at a remote user terminal 204) of a prohibited action, such as by intercepting an outgoing email including protected data, and/or the like.

Additionally or alternatively, the exception handling unit 118 may be configured to detect attempted performance of a prohibited action based on receipt of an indication that performance of a prohibited action has been attempted. For example, data loss prevention policies may be implemented by software controls configured to prohibit performance of certain actions. Such software controls may, for example, be implemented by dedicated security software, integrated into email software and/or other end-user software, implemented as an operating system process, and/or the like. Software controls may accordingly inform the exception handling unit 118 of an attempted performance of the prohibited action. The exception handling unit 118 may accordingly be configured to detect an attempted performance of a prohibited action involving protected data on the basis of such a received indication.

A detected prohibited action may comprise any action that may be prohibited by default for data loss prevention purposes. By way of example, such actions may include actions to save data in a manner that may risk distribution of protected data to an unauthorized party. For example, prohibited save actions may include actions to save protected data to an unsecured memory, to a shared storage, to a shared network folder, to a portable memory (e.g., removable media, such as a CD, DVD, tape drive, or the like; a flash drive, an external hard drive, or the like), and/or the like. By way of a further example, prohibited actions may include transport actions that may result in dissemination of protected data to an unauthorized party. For example, prohibited transport actions may include emailing protected data to an external recipient, emailing unencrypted protected data, posting protected data to an unsecured/external website, posting protected data to a social media site (e.g., Facebook, LinkedIn, Twitter, or the like), and/or the like.

Protected data may include any type of sensitive data for which data loss prevention measures may be implemented to prevent loss of the protected data, dissemination of the protected data to an unauthorized party (e.g., to a party outside of a protected computer system, to a non-authorized user, and/or the like), and/or the like. For example, in embodiments wherein exception handling in accordance with an embodiment disclosed herein is applied in a health care context, protected data may comprise PHI. Such PHI may, for example, include demographic information, medical history, test and laboratory results, insurance information and other data that may be collected by a health care professional to identify an individual and determine appropriate care for the individual. As another example, protected data may additionally or alternatively comprise Protected Customer Information (PCI), which may uniquely identify a customer or other individual and/or provide personal financial information. By way of example, PCI may include a credit card number, a date of birth, driver's license number, military identification number, social security number, and/or the like.

The exception handling unit 118 may be further configured to determine a user associated with a detected attempted prohibited action. The associated user may, for example, comprise a user that attempted to perform the prohibited action. The associated user may, for example, have a system identity, such as a username or other identification that may uniquely identify the user on a monitored system.

In some example embodiments, the exception handling unit 118 may be configured to validate the user's identity and/or determine whether the user's identity has previously been validated, such as at a time of session log-in. In some example embodiments, validation of a user's identity may comprise a multi-factor validation that may require authentication of a user's identity on the basis of multiple credentials asserting the user's identity. For example, multifactor validation may be performed on the basis of some combination of a username-password combination, a biometric identification, a token (e.g., a log-in token), and/or the like. In some example embodiments, multifactor validation of a user identity may be performed in accordance with one or more regulations governing handling of protected data, such as HIPAA (Health Insurance Portability and Accountability Act) regulations. In embodiments wherein the exception handling unit 118 is configured to determine whether an identity of the user associated with an attempt to perform a prohibited action has been verified, the exception handling unit 118 may be configured to deny an exception and prohibit performance of the prohibited action in an instance in which the user's identity has not been verified and/or cannot be verified.

The exception handling unit 118 may be additionally or alternatively configured to determine a role that may be associated with a user associated with an attempted performance of a prohibited action. In this regard, the user may be associated with a role that may be mapped to one or more rights or privileges given to the user. The associated role may comprise a role associated with the user on the basis of the user's work responsibilities, job title, and/or the like. For example, users of a system that are physicians may be assigned the role "physician." As another example, users of a system that are discharge nurses may be assigned the role of "discharge nurse." Accordingly, a role may be mapped to one or more exceptions allowing performance of one or more prohibited actions. Thus, for example, the role of discharge nurse may be conferred with an elevated right permitting an exception allowing performance of saving PHI data to an encrypted flash drive. As another example, the role of physician may be conferred with an elevated right permitting an exception allowing an email including encrypted PHI/PCI data to an external recipient.

The exception handling unit 118 may be further configured to determine based at least in part on a role associated with a user whether the user has elevated rights permitting performance of the attempted prohibited action. In this regard, the exception handling unit 118 may be configured to determine whether the role associated with the user is mapped to an exception required for permitting the attempted prohibited action. The exception handling unit 118 may be configured to permit an exception allowing performance of the attempted prohibited action only in an instance in which it is determined that the user does have elevated rights permitting performance of the prohibited action.

A database of roles and mapped exceptions may, for example, be maintained at the exception handling apparatus 102, such as in the memory 112, or may be maintained in a storage that may be accessible to the exception handling apparatus 102, such as over the network 206. Accordingly, the exception handling unit 118 may be configured to access a database or other record of roles and corresponding mapped exceptions to facilitate determining whether a user has elevated rights permitting performance of an attempted prohibited action.

In some example embodiments, the exception handling unit 118 may be configured to permit an exception allowing performance of an attempted prohibited action by a user determined to have elevated rights permitting such an exception only in an instance in which one or more conditions for granting the exception are satisfied. For example, in some example embodiments, the exception handling unit 118 may be configured to determine whether a condition associated with a result of performance of the prohibited action is satisfied. As an example, in an instance in which an attempt to send an email including protected data to an external recipient is detected, the exception handling unit 118 may be configured to determine whether the external recipient is permitted to receive the email including protected data, and may permit an exception allowing the email including protected data to be sent to the external recipient only in an instance in which the external recipient is permitted to receive the email. As another example, in an instance in which an attempt to save protected data to a prohibited memory (e.g., a flash drive, removable disc, external drive, or the like), the exception handling unit 118 may be configured to determine whether the prohibited memory to which the protected data would be saved is encrypted, and may permit an exception allowing the protected data to be saved to the prohibited memory only in an instance in which it is determined that the prohibited memory is encrypted.

In an instance in which the exception handling unit 118 permits an exception allowing performance of a prohibited action, the exception may be automatically permitted without requiring approval by an administrator. However, in some example embodiments, the exception handling unit 118 may be configured to generate a report of the granted exception and/or may record details of the granted exception in a log. Further, in some example embodiments, if the exception handling unit 118 does not grant an exception allowing performance of a prohibited action, the exception handling unit 118 may generate a report and/or record details of the attempted prohibited action in a log. Accordingly, an administrator may later review attempted prohibited actions and/or granted exceptions.

FIG. 3 illustrates a flowchart according to an example method for exception handling according to some example embodiments. In this regard, FIG. 3 illustrates a method that may be at least partially performed by an exception handling apparatus 102. The operations illustrated in and described with respect to FIG. 3 may, for example, be performed by, with the assistance of, and/or under the control of one or more of the processor 110, memory 112, communication interface 114, user interface 116, or exception handling unit 118. Operation 300 may comprise detecting attempted performance of a prohibited action involving protected data. The processor 110, memory 112, communication interface 114, user interface 116, and/or exception handling unit 118 may, for example, provide means for performing operation 300. Operation 310 may comprise determining, based at least in part on a role associated with a user associated with the prohibited action, whether the user has elevated rights permitting performance of the prohibited action. The processor 110, memory 112, communication interface 114, and/or exception handling unit 118 may, for example, provide means for performing operation 310. If it is determined that the user does not have elevated rights, operation 320 may comprise prohibiting performance of the prohibited action. The processor 110, memory 112, communication interface 114, user interface 116, and/or exception handling unit 118 may, for example, provide means for performing operation 320. If, however, it is determined that the user does have elevated rights permitting an exception, operation 330 may comprise permitting an exception allowing performance of the prohibited action. The processor 110, memory 112, communication interface 114, user interface 116, and/or exception handling unit 118 may, for example, provide means for performing operation 330. It will be appreciated, however, based on the preceding and ensuing description that, in some example embodiments, one or more additional conditions may need to be met in addition to the user having elevated rights for an exception to be granted.

FIG. 4 illustrates a flowchart according to another example method for exception handling according to some example embodiments. In this regard, FIG. 4 illustrates a method that may be at least partially performed by an exception handling apparatus 102. The operations illustrated in and described with respect to FIG. 4 may, for example, be performed by, with the assistance of, and/or under the control of one or more of the processor 110, memory 112, communication interface 114, user interface 116, or exception handling unit 118. Operation 400 may comprise detecting an action. The processor 110, memory 112, communication interface 114, user interface 116, and/or exception handling unit 118 may, for example, provide means for performing operation 400. Operation 410 may comprise determining whether the detected action is prohibited if it involves protected data. The processor 110, memory 112, communication interface 114, and/or exception handling unit 118 may, for example, provide means for performing operation 410. In an instance in which it is determined in operation 410 that the operation is not prohibited, even if it involves protected data, the method may proceed to operation 480, which may comprise permitting performance of the action. The processor 110, memory 112, communication interface 114, user interface 116, and/or exception handling unit 118 may, for example, provide means for performing operation 480. If, however, it is determined in operation 410 that the action is prohibited if it involves protected data, the method may proceed to operation 420.

Operation 420 may comprise determining whether the detected action involves protected data. The processor 110, memory 112, communication interface 114, user interface 116, and/or exception handling unit 118 may, for example, provide means for performing operation 420. In an instance in which it is determined in operation 420 that the detected action does not involve protected data, the method may proceed to operation 480, and performance of the action may be permitted. If, however, it is determined in operation 420 that the detected action does involve protected data, the method may proceed to operation 430.

Operation 430 may comprised determining whether an identity of a user associated with the detected action has been validated. In this regard, operation 430 may comprise determining whether the user's identity was previously validated, such as at a time of session log-in. Additionally or alternatively, operation 430 may comprise actually validating the user and/or re-validating the user's identity, such as through a multifactor authentication process. The processor 110, memory 112, communication interface 114, user interface 116, and/or exception handling unit 118 may, for example, provide means for performing operation 430. In an instance in which it is determined in operation 430 that the user's identity has not been validated and/or cannot be validated, the method may proceed to operation 470, which may comprise prohibiting performance of the action. The processor 110, memory 112, communication interface 114, user interface 116, and/or exception handling unit 118 may, for example, provide means for performing operation 470. If, however, it is determined in operation 430 that the user's identity has been properly validated, the method may proceed to operation 440.

Operation 440 may comprise identifying a role associated with the user. The processor 110, memory 112, communication interface 114, and/or exception handling unit 118 may, for example, provide means for performing operation 440. Operation 450 may comprise determining whether there are elevated rights associated with the role. The processor 110, memory 112, communication interface 114, and/or exception handling unit 118 may, for example, provide means for performing operation 450. In an instance in which it is determined at operation 450 that there are not any elevated rights associated with the role, the method may proceed to operation 470, wherein performance of the action may be prohibited. If, however, it is determined in operation 450 that there are elevated rights associated with the role, the method may proceed to operation 460.

Operation 460 may comprise determining whether performance of the detected action is permitted by an exception permitted to the user based on the elevated rights associated with the role. The processor 110, memory 112, communication interface 114, and/or exception handling unit 118 may, for example, provide means for performing operation 460. In an instance in which it is determined at operation 460 that the user's role does not permit an exception allowing performance of the detected action, the method may proceed to operation 470, and performance of the action may be prohibited. If, however, it is determined at operation 460 that the user's role does permit an exception allowing performance of the action, the method may proceed to operation 480, and an exception allowing performance of the action may be permitted.

FIG. 5 illustrates a flowchart according to a further example method for exception handling according to some example embodiments. More particularly, FIG. 5 illustrates an example method for exception handling that may be applied when an attempt to send an email with an attachment in a health care setting is detected. The method illustrated in FIG. 5 may be at least partially performed by an exception handling apparatus 102. In this regard, the operations illustrated in and described with respect to FIG. 5 may, for example, be performed by, with the assistance of, and/or under the control of one or more of the processor 110, memory 112, communication interface 114, user interface 116, or exception handling unit 118. Operation 500 may comprise detecting that a user (User 234681) has attempted to attach lab results to an email to be sent to an external recipient. The processor 110, memory 112, communication interface 114, user interface 116, and/or exception handling unit 118 may, for example, provide means for performing operation 500. Operation 510 may comprise a data loss prevention client, such as may be implemented in accordance with one or more example embodiments, searching content of the email and/or attached lab results for PCI, PHI, and/or other protected data. The processor 110, memory 112, communication interface 114, and/or exception handling unit 118 may, for example, provide means for performing operation 510. In an instance in which no protected data is found at operation 510, the method may proceed to operation 580, in which the email message may be allowed to be sent to the external recipient. The processor 110, memory 112, communication interface 114, user interface 116, and/or exception handling unit 118 may, for example, provide means for performing operation

580. If, however, protected data is found at operation 510, the method may proceed to operation 520.

Operation 520 may comprise performing a validation of the user's asserted identity, such as to validate that the user is actually User 234681. The processor 110, memory 112, communication interface 114, user interface 116, and/or exception handling unit 118 may, for example, provide means for performing operation 520. In some example embodiments, this validation may have been performed previously, such as at a time of session log-in. Accordingly, it will be appreciated that in some example embodiments wherein the user's identity is validated prior to detection of the prohibited action and is not required to be re-validated, operation 520 may be omitted. Operation 530 may comprise determining whether the user's identity has been properly validated. In this regard, operation 530 may, for example, comprise determining whether the user's asserted identity has been successfully multi-factor authenticated. The processor 110, memory 112, communication interface 114, and/or exception handling unit 118 may, for example, provide means for performing operation 530. In an instance in which it is determined at operation 530 that the user's identity has not been properly multi-factor authenticated, the method may proceed to operation 540. Operation 540 may comprise denying permission to send the external email and attached lab results. Operation 540 may further comprise logging the attempted action. An alert may additionally be sent to the user and/or a party, such as a system administrator, that may be responsible for data loss prevention measures. The processor 110, memory 112, communication interface 114, user interface 116, and/or exception handling unit 118 may, for example, provide means for performing operation 540. If, however, it is determined at operation 530 that the user's identity has properly been validated (e.g., through multi-factor authentication), the method may proceed to operation 550.

Operation 550 may comprise sending a role-based identity management request query, such as to a database mapping users to respective roles mapped to elevated rights. In this regard, operation 550 may comprise querying for User 234581 to identify the role associated with the user. The processor 110, memory 112, communication interface 114, and/or exception handling unit 118 may, for example, provide means for performing operation 550. Operation 560 may comprise determining whether the role associated with the user confers any elevated rights. The processor 110, memory 112, communication interface 114, and/or exception handling unit 118 may, for example, provide means for performing operation 560. In an instance in which it is determined at operation 560 that the role associated with the user does not confer any elevated rights on the user, the method may proceed to operation 540, and an exception allowing the email including attached lab results to be sent to the external recipient may be denied. If, however, it is determined at operation 560 that the role associated with the user does confer elevated rights on the user, the method may proceed to operation 570.

Operation 570 may comprise applying the exception(s) conferred by the elevated rights mapped to the user's role to determine whether the user is permitted an exception allowing the email to be sent to the external recipient by virtue of the user's role. The processor 110, memory 112, communication interface 114, and/or exception handling unit 118 may, for example, provide means for performing operation 570. In an instance in which it is determined at operation 570 that the user is not permitted an exception allowing the email to be sent, the method may proceed to operation 540, and an exception allowing the email including attached lab results to be sent to the external recipient may be denied. If, however, it is determined at operation 570 that the user is permitted an exception allowing the email to be sent, the method may proceed to operation 580 such that an exception allowing the email including the attached lab results to be sent to the external recipient may be permitted.

FIG. 6 illustrates a flowchart according to yet another example method for exception handling according to some example embodiments. More particularly, FIG. 6 illustrates an example method for exception handling that may be applied when an attempt to send an external email with an attachment containing PHI and/or PCI in a health care setting is detected. The method illustrated in FIG. 6 may be at least partially performed by an exception handling apparatus 102. In this regard, the operations illustrated in and described with respect to FIG. 6 may, for example, be performed by, with the assistance of, and/or under the control of one or more of the processor 110, memory 112, communication interface 114, user interface 116, or exception handling unit 118. Operation 600 may comprise detecting that a user (User 654381) has attempted to attach a patient record to an email to be sent to an external recipient. The processor 110, memory 112, communication interface 114, user interface 116, and/or exception handling unit 118 may, for example, provide means for performing operation 600. Operation 605 may comprise a data loss prevention client, such as may be implemented in accordance with one or more example embodiments, searching content of the email and/or attached patient record for PCI, PHI, and/or other protected data. The processor 110, memory 112, communication interface 114, and/or exception handling unit 118 may, for example, provide means for performing operation 605. In an instance in which no protected data is found at operation 605, the method may proceed to operation 665, in which the email message may be allowed to be sent to the external recipient. The processor 110, memory 112, communication interface 114, user interface 116, and/or exception handling unit 118 may, for example, provide means for performing operation 665. If, however, protected data is found at operation 605, the method may proceed to operation 610.

Operation 610 may comprise performing a validation of the user's asserted identity, such as to validate that the user is actually User 654381. The processor 110, memory 112, communication interface 114, user interface 116, and/or exception handling unit 118 may, for example, provide means for performing operation 610. In some example embodiments, this validation may have been performed previously, such as at a time of session log-in. Accordingly, it will be appreciated that in some example embodiments wherein the user's identity is validated prior to detection of the prohibited action and is not required to be re-validated, operation 610 may be omitted. Operation 615 may comprise determining whether the user's identity has been properly validated. In this regard, operation 615 may, for example, comprise determining whether the user's asserted identity has been successfully multi-factor authenticated. The processor 110, memory 112, communication interface 114, and/or exception handling unit 118 may, for example, provide means for performing operation 615. In an instance in which it is determined at operation 615 that the user's identity has not been properly multi-factor authenticated, the method may proceed to operation 620. Operation 620 may comprise denying permission to send the external email and attached patient record. Operation 620 may further comprise logging the attempted action. An alert may additionally be sent to the user and/or a party, such as a system administrator, that may be responsible for data loss prevention measures. The processor 110, memory 112, communication interface 114, user interface 116, and/or exception handling unit 118 may, for example, provide means for performing operation 620. If, however, it is determined at operation 615 that the user's identity has properly been validated (e.g., through multi-factor authentication), the method may proceed to operation 625.

Operation 625 may comprise sending a role-based identity management request query, such as to a database mapping users to respective roles mapped to elevated rights. In this regard, operation 625 may comprise querying for User 654381 to identify the role associated with the user. The processor 110, memory 112, communication interface 114, and/or exception handling unit 118 may, for example, provide means for performing operation 625. Operation 630 may comprise determining whether the role associated with the user confers any elevated rights. The processor 110, memory 112, communication interface 114, and/or exception handling unit 118 may, for example, provide means for performing operation 630. In an instance in which it is determined at operation 630 that the role associated with the user does not confer any elevated rights on the user, the method may proceed to operation 620, and an exception allowing the email including attached lab results to be sent to the external recipient may be denied. If, however, it is determined at operation 630 that the role associated with the user does confer elevated rights on the user, the method may proceed to operation 635.

In the example of FIG. 6, the user may be conferred with elevated rights permitting an exception allowing sending an email with protected data to an external recipient if the user is associated with the role of "active physician," as indicated by operation 635. However, an additional condition of the external recipient being permitted to receive the email including protected data may be required to be satisfied prior to granting an exception. In this regard, operation 640 may comprise looking up a role associated with the recipient. The processor 110, memory 112, communication interface 114, and/or exception handling unit 118 may, for example, provide means for performing operation 640. If it is determined based on the recipient role lookup of operation 640 that the role associated with the recipient is not mapped to an applicable exception, the method may proceed to operation 620, and an exception allowing the email including attached lab results to be sent to the external recipient may be denied. If, however, it is determined based on the recipient role lookup of operation 640 that an applicable exception is found, the method may proceed to operation 645.

In the example of FIG. 6, an exception allowing an email including protected data to an external recipient may be permitted if the recipient is associated with the role of "active physician," as indicated by operation 645. Operation 650 may comprise invoking an exception allowing the email including attached patient record to be sent to the external recipient. Multiple jobs, or operations, may be spawned in response to invocation of the exception. The processor 110, memory 112, communication interface 114, and/or exception handling unit 118 may, for example, provide means for performing operation 650. Operation 655 may comprise logging the request and exception. The processor 110, memory 112, communication interface 114, and/or exception handling unit 118 may, for example, provide means for performing operation 655. Operation 660 may comprise a client program, such as may be implemented in accordance with one or more example embodiments, launching an email encryption applet and encrypting at least the portion of the email and/or attached patient record including protected data. The processor 110, memory 112, communication interface 114, and/or exception handling unit 118 may, for example, provide means for performing operation 660. Operation 665 may comprise allowing the email message including the encrypted protected data to be sent to the external recipient.

FIG. 7 illustrates a flowchart according to still a further example method for exception handling according to some example embodiments. More particularly, FIG. 7 illustrates an example method for exception handling that may be applied when an attempt to save data to a prohibited removable memory, such as a flash drive, in a health care setting is detected. The method illustrated in FIG. 7 may be at least partially performed by an exception handling apparatus 102. In this regard, the operations illustrated in and described with respect to FIG. 7 may, for example, be performed by, with the assistance of, and/or under the control of one or more of the processor 110, memory 112, communication interface 114, user interface 116, or exception handling unit 118. Operation 700 may comprise detecting that a user has attempted to save data to a removable flash drive. The processor 110, memory 112, communication interface 114, user interface 116, and/or exception handling unit 118 may, for example, provide means for performing operation 700. Operation 705 may comprise a data loss prevention client, such as may be implemented in accordance with one or more example embodiments, searching the data to be saved to the flash drive for PCI, PHI, and/or other protected data. The processor 110, memory 112, communication interface 114, and/or exception handling unit 118 may, for example, provide means for performing operation 705. In an instance in which no protected data is found at operation 705, the method may proceed to operation 765, in which the data may be allowed to be saved to the flash drive. The processor 110, memory 112, communication interface 114, user interface 116, and/or exception handling unit 118 may, for example, provide means for performing operation 765. If, however, protected data is found at operation 705, the method may proceed to operation 710.

Operation 710 may comprise performing a validation of the user's asserted identity. The processor 110, memory 112, communication interface 114, user interface 116, and/or exception handling unit. 118 may, for example, provide means for performing operation 710. In some example embodiments, this validation may have been performed previously, such as at a time of session log-in. Accordingly, it will be appreciated that in some example embodiments wherein the user's identity is validated prior to detection of the prohibited action and is not required to be re-validated, operation 710 may be omitted. Operation 715 may comprise determining whether the user's identity has been properly validated. In this regard, operation 715 may, for example, comprise determining whether the user's asserted identity has been successfully multi-factor authenticated. The processor 110, memory 112, communication interface 114, and/or exception handling unit 118 may, for example, provide means for performing operation 715. In an instance in which it is determined at operation 715 that the user's identity has not been properly multi-factor authenticated, the method may proceed to operation 720. Operation 720 may comprise denying permission to save the data to the flash drive. Operation 720 may further comprise logging the attempted action. An alert may additionally be sent to the user and/or a party, such as a system administrator, that may be responsible for data loss prevention measures. The processor 110, memory 112, communication interface 114, user interface 116, and/or exception handling unit 118 may, for example, provide means for performing operation 720. If, however, it is determined at operation 715 that the user's identity has properly been validated (e.g., through multi-factor authentication), the method may proceed to operation 725.

Operation 725 may comprise sending a role-based identity management request query, such as to a database mapping users to respective roles mapped to elevated rights. In this regard, operation 725 may comprise querying for the user's identity to identify the role associated with the user. The processor 110, memory 112, communication interface 114, and/or exception handling unit 118 may, for example, provide means for performing operation 725. Operation 730 may comprise determining whether the role associated with the user confers any elevated rights. The processor 110, memory 112, communication interface 114, and/or exception handling unit 118 may, for example, provide means for performing operation 730. In an instance in which it is determined at operation 730 that the role associated with the user does not confer any elevated rights on the user, the method may proceed to operation 720, and an exception allowing the data to be saved to the flash drive may be denied. If, however, it is determined at operation 730 that the role associated with the user does confer elevated rights on the user, the method may proceed to operation 735.

In the example of FIG. 7, the user may be conferred with elevated rights in an instance in which the user is associated with the role of "active clinician," as indicated by operation 735. Operation 740 may comprise determining whether the role of active clinician is mapped to an exception allowing protected data to be saved to a flash drive. The processor 110, memory 112, communication interface 114, and/or exception handling unit 118 may, for example, provide means for performing operation 740. In an instance in which it is determined at operation 740 that the role associated with the user (e.g., active clinician) is not mapped to an exception allowing protected data to be saved to a flash drive, the method may proceed to operation 720, and an exception permitting the user to save data to the flash drive may be denied. If, however, it is determined, at operation 740 that the role associated with the user (e.g., active clinician) is mapped to an exception allowing protected data to be saved to a flash drive, the method may proceed to operation 745.

Operation 745 may comprise determining whether the flash drive is encrypted. The processor 110, memory 112, communication interface 114, and/or exception handling unit 118 may, for example, provide means for performing operation 745. In this regard, an additional condition of the flash drive being encrypted may be required to be satisfied prior to granting an exception. If it is determined at operation 745 that the flash drive is not encrypted, the method may proceed to operation 720, and an exception allowing the protected data to be saved to the flash drive may be denied. If, however, it is determined at operation 745 that the flash drive is encrypted, the method may proceed to operation 750.

Operation 750 may comprise invoking an exception allowing the data to be saved to the flash drive. Multiple jobs, or operations, may be spawned in response to invocation of the exception. The processor 110, memory 112, communication interface 114, and/or exception handling unit 118 may, for example, provide means for performing operation 750. Operation 755 may comprise logging the request and exception. The processor 110, memory 112, communication interface 114, and/or exception handling unit 118 may, for example, provide means for performing operation 755. Operation 765 may comprise allowing the data to be saved to the flash drive.

FIGS. 3-7 each illustrate a flowchart of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., an exception handling apparatus 102, user terminal 204, or combination thereof) and executed by a processor (e.g., the processor 110) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for exception handling, the method comprising:
    detecting attempted performance of a prohibited action involving protected data by at least detecting an attempt to send an email including protected data to an external recipient of the email;
    determining, by a processor, based at least in part on a role associated with a user associated with the prohibited action whether the user has rights permitting performance of the prohibited action;
    permitting an exception allowing performance of the prohibited action only in an instance in which it is determined that the user does have rights permitting performance of the prohibited action;
    prohibiting performance of the prohibited action in an instance in which it is determined that the user does not have rights permitting performance of the prohibited action;
    determining whether the external recipient is authorized to receive the protected data based at least in part on a role associated with the external recipient, wherein the role associated with the external recipient indicates whether the external recipient is authorized to receive the protected data via the email; and
    permitting an exception allowing sending of the email including protected data to the external recipient only in an instance in which the role associated with the external recipient indicates that the external recipient is authorized to receive the protected data via the email.

2. The method of claim 1, wherein determining whether the user has rights permitting performance of the prohibited action comprises determining whether the role associated with the user is mapped to an exception allowing performance of the prohibited action.

3. The method of claim 1, wherein permitting an exemption allowing performance of the prohibited action in an instance in which it is determined that the user does have rights permitting performance of the prohibited action comprises automatically permitting an exception allowing performance of the prohibited action without requiring approval by an administrator.

4. The method of claim 1, further comprising:
    determining whether an identity of the user has been validated; and
    permitting an exception allowing performance of the prohibited action only in an instance in which the identity of the user has been validated.

5. The method of claim 1, further comprising:
    determining whether a condition associated with a result of performance of the prohibited action is satisfied; and
    permitting an exception allowing performance of the prohibited action only in an instance in which it is determined that the condition associated with a result of performance of the prohibited action is satisfied.

6. The method of claim 1, wherein detecting attempted performance of a prohibited action involving protected data comprises detecting an attempt to save protected data to a prohibited memory.

7. The method of claim 6, further comprising:
    determining whether the prohibited memory is encrypted; and
    permitting an exception allowing saving of the protected data to the prohibited memory only in an instance in which it is determined that the prohibited memory is encrypted.

8. The method of claim 1, wherein the protected data comprises one or more of protected health information or protected customer information.

9. An apparatus for exception handling, the apparatus comprising at least one processor, wherein the at least one processor is configured to cause the apparatus to at least:
    detect attempted performance of a prohibited action involving protected data by at least detecting an attempt to send an email including protected data to an external recipient of the email;
    determine based at least in part on a role associated with a user associated with the prohibited action whether the user has rights permitting performance of the prohibited action;
    permit an exception allowing performance of the prohibited action only in an instance in which it is determined that the user does have rights permitting performance of the prohibited action;
    prohibit performance of the prohibited action in an instance in which it is determined that the user does not have rights permitting performance of the prohibited action;
    determine whether the external recipient is authorized to receive the protected data based at least in part on a role associated with the external recipient, wherein the role associated with the external recipient indicates whether the external recipient is authorized to receive the protected data via the email; and
    permit an exception allowing sending of the email including protected data to the external recipient only in an instance in which the role associated with the external recipient indicates that the external recipient is authorized to receive the protected data via the email.

10. The apparatus of claim 9, wherein the at least one processor is configured to further cause the apparatus to determine whether the user has rights permitting performance of the prohibited action at least in part by determining whether the role associated with the user is mapped to an exception allowing performance of the prohibited action.

11. The apparatus of claim 9, wherein the at least one processor is configured to further cause the apparatus to permit an exception allowing performance of the prohibited action in an instance in which it is determined that the user does have rights permitting performance of the prohibited action by automatically permitting an exception allowing performance of the prohibited action without requiring approval by an administrator.

12. The apparatus of claim 9, wherein the at least one processor is configured to further cause the apparatus to:
    determine whether an identity of the user has been validated; and
    permit an exception allowing performance of the prohibited action only in an instance in which the identity of the user has been validated.

13. The apparatus of claim 9, wherein the at least one processor is configured to further cause the apparatus to:
determine whether a condition associated with a result of performance of the prohibited action is satisfied; and
permit an exception allowing performance of the prohibited action only in an instance in which it is determined that the condition associated with a result of performance of the prohibited action is satisfied.

14. The apparatus of claim 9, wherein the at least one processor is configured to further cause the apparatus to detect attempted performance of a prohibited action involving protected data cat least in part by detecting an attempt to send an email including protected data to an external recipient.

15. The apparatus of claim 14, wherein the at least one processor is configured to further cause the apparatus to:
determine based at least in part on a role associated with the external recipient whether the external recipient is permitted to receive the email including protected data; and
permit am exception allowing sending of the email including protected data to the external recipient only in an instance in which it is determined that the external recipient is permitted to receive the email including protected data.

16. The apparatus of claim 9, wherein the at least one processor is configured to further cause the apparatus to:
determine whether the particular memory is encrypted; and
permit an exception allowing saving of the protected data to the particular memory only in an instance in which it is determined that the particular memory is encrypted.

17. The apparatus of claim 9, further comprising at least one memory storing instructions that when executed by the at least one processor cause the apparatus to:
detect attempted performance of a prohibited action involving protected data;
determine based at least in part on a role associated with a user associated with the prohibited action whether the user has rights permitting performance of the prohibited action;
permit an exception allowing performance of the prohibited action only in an instance in which it is determined that the user does have rights permitting performance of the prohibited action; and
prohibit performance of the prohibited action in an instance in which it is determined that the user does not have rights permitting performance of the prohibited action.

18. A computer program product for exception handling, the computer program product comprising at least one non-transitory computer-readable storage medium having computer-readable program instructions stored therein, the computer-readable program instructions comprising:
program instructions configured to detect attempted performance of a prohibited action involving protected data, by at least detecting an attempt to send an email including protected data to an external recipient of the email;
program instructions configured to determine based at least in part on a role associated with a user associated with the prohibited action whether the user has rights permitting performance of the prohibited action;
program instructions configured to permit an exception allowing performance of the prohibited action only in an instance in which it is determined that the user does have rights permitting performance of the prohibited action;
program instructions configured to prohibit performance of the prohibited action in an instance in which it is determined that the user does not have rights permitting performance of the prohibited action;
program instructions configured to determine whether the external recipient is authorized to receive the protected data based at least in part on a role associated with the external recipient, wherein the role associated with the external recipient indicates whether the external recipient is authorized to receive the protected data via the email; and
program instructions configured to permit an exception allowing sending of the email including protected data to the external recipient only in an instance in which the role associated with the external recipient indicates that the external recipient is authorized to receive the protected data via the email.

* * * * *